(12) United States Patent
Chin et al.

(10) Patent No.: US 8,300,479 B2
(45) Date of Patent: Oct. 30, 2012

(54) TEMPORAL ALIGNMENT OF DATA UNIT GROUPS IN A SWITCH

(75) Inventors: Chung Kuang Chin, Saratoga, CA (US); Edward E. Sprague, Woodside, CA (US); Prasad Paranjape, Fremont, CA (US); Swaroop Raghunatha, Milpitas, CA (US); Venkat Talapaneni, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 221 days.

(21) Appl. No.: 12/731,948

(22) Filed: Mar. 25, 2010

(65) Prior Publication Data
US 2011/0235438 A1 Sep. 29, 2011

(51) Int. Cl.
*G11C 7/00* (2006.01)
*G11C 8/00* (2006.01)

(52) U.S. Cl. .............. 365/189.05; 365/189.17; 365/194; 365/230.03; 365/230.05; 365/233.1

(58) Field of Classification Search ............. 365/189.05, 365/189.17, 194, 230.03, 230.05, 233.1
See application file for complete search history.

(56) References Cited

U.S. PATENT DOCUMENTS

| | | | | |
|---|---|---|---|---|
| 5,255,239 A * | 10/1993 | Taborn et al. | ............ | 365/230.05 |
| 5,602,780 A * | 2/1997 | Diem et al. | ............ | 365/189.05 |
| 6,909,643 B2 * | 6/2005 | Kwean | ............ | 365/189.05 |
| 7,184,329 B2 * | 2/2007 | Silvestri | ............ | 365/194 |
| 7,212,449 B2 * | 5/2007 | Lee | ............ | 365/189.05 |
| 7,349,289 B2 * | 3/2008 | Faue et al. | ............ | 365/189.05 |
| 7,372,755 B2 * | 5/2008 | Bahl et al. | ............ | 365/230.05 |
| 7,437,500 B2 * | 10/2008 | Butt et al. | ............ | 365/189.05 |
| 7,546,390 B2 * | 6/2009 | Horowitz et al. | ........ | 365/189.05 |
| 7,719,904 B2 * | 5/2010 | Lee | ............ | 365/189.05 |
| 7,778,095 B2 * | 8/2010 | Na | ............ | 365/189.05 |
| 7,865,661 B2 * | 1/2011 | Butt et al. | ............ | 365/189.05 |
| 7,903,499 B2 * | 3/2011 | Kim et al. | ............ | 365/189.05 |
| 7,965,567 B2 * | 6/2011 | Hampel et al. | ............ | 365/189.05 |
| 8,072,822 B2 * | 12/2011 | Jeong et al. | ............ | 365/189.05 |

* cited by examiner

*Primary Examiner* — Trong Phan
(74) *Attorney, Agent, or Firm* — David L. Soltz

(57) ABSTRACT

Consistent with the present disclosure, a plurality of FIFO buffers, for example, are provided in a switch, which also includes a switch fabric. Each of the plurality of FIFOs is pre-filled with data for a duration based on a skew or time difference between the time that a data unit group is supplied to its corresponding FIFO and a reference time. The reference time is the time, for example, after a delay period has lapsed following the leading edge of a synch signal, the timing of which is a known system parameter and is used to trigger switching in the switch fabric. Typically, the delay period may be equal to the latency (often, another known system parameter) or length of time required for the data unit to propagate from an input circuit, such as a line card of the switch or another switch, to the FIFO that receives the data unit. At the reference time, temporally aligned data unit groups may be read or output from each FIFO and supplied to the switch fabric. Since the timing of the output from the FIFOs is based on known system parameters, instead of the actual arrival of the slowest data unit group at its corresponding FIFO, time aligned data unit groups may be output regardless of whether the slowest data unit group is available.

18 Claims, 11 Drawing Sheets

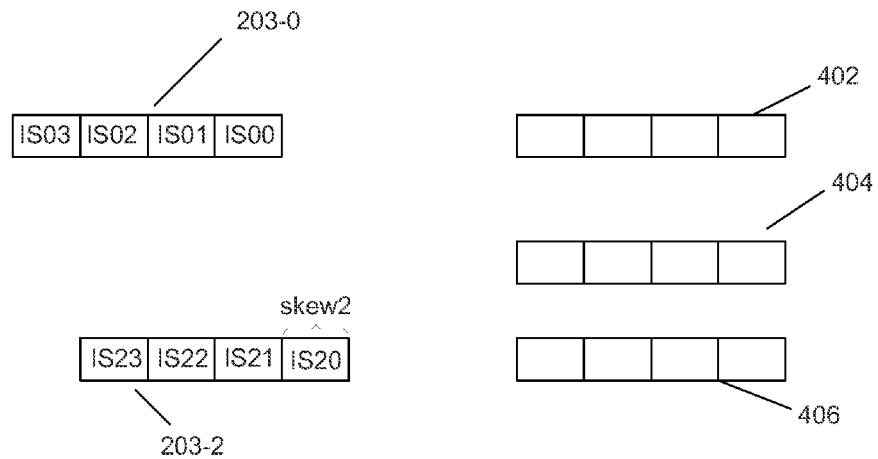
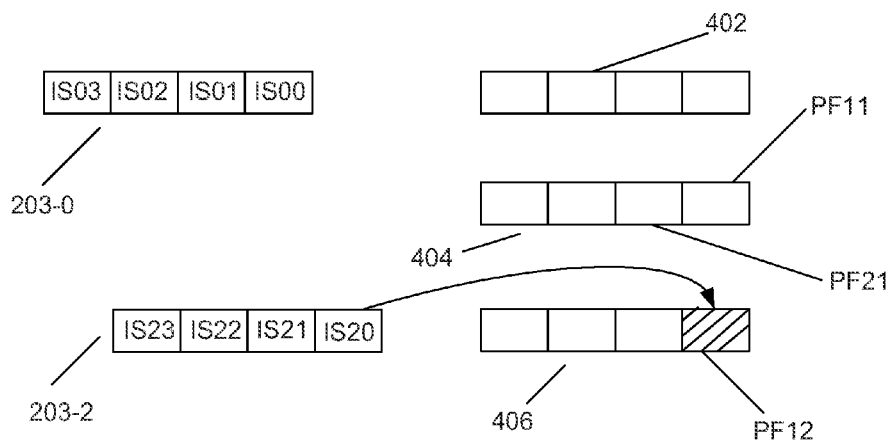
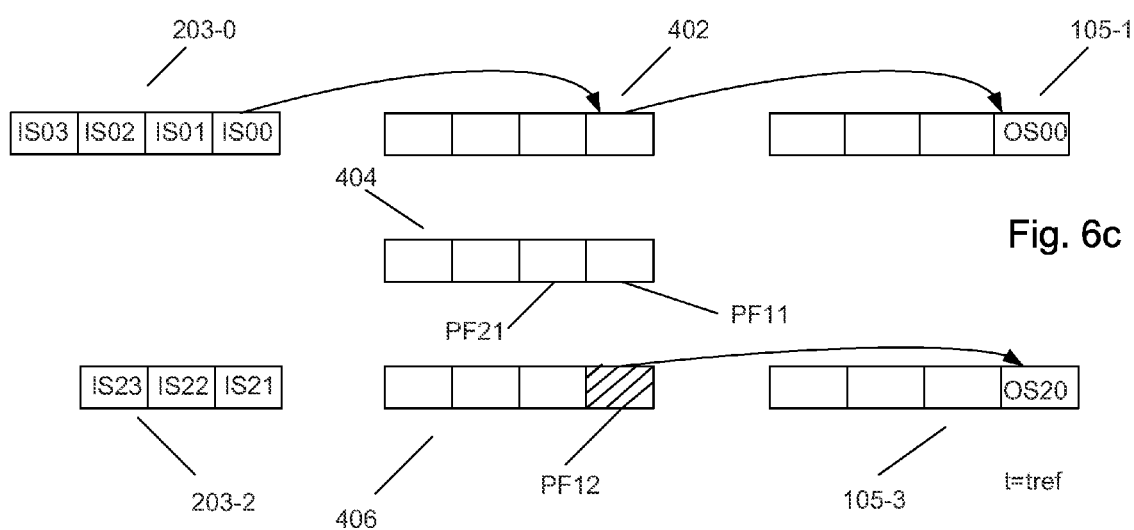
Fig. 6a
Fig. 6b
Fig. 6c

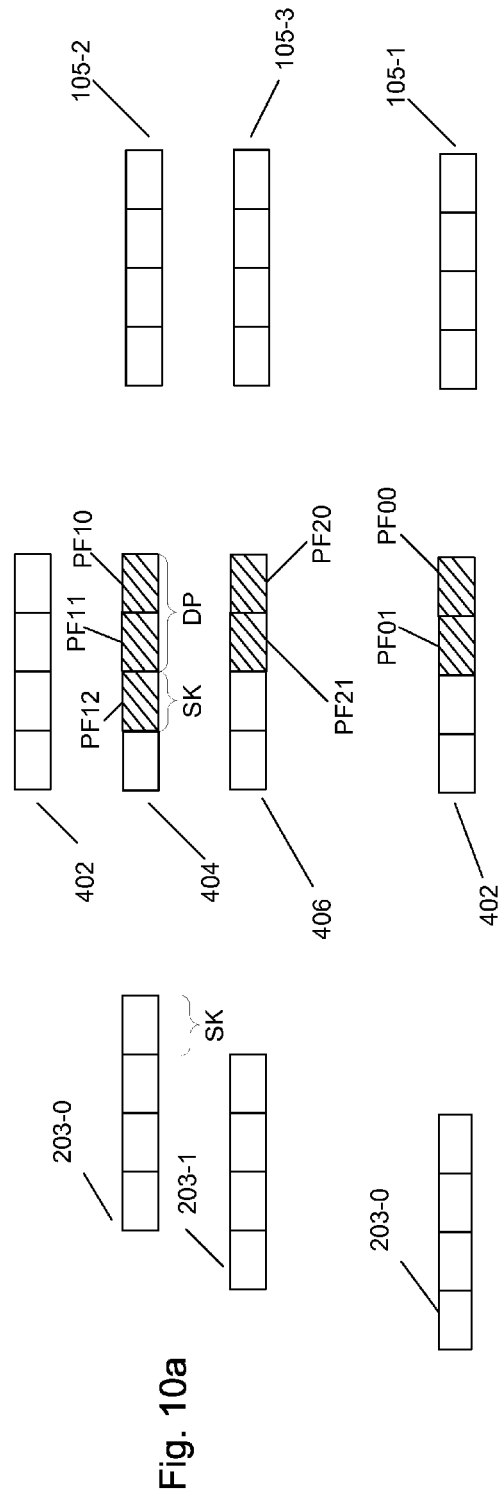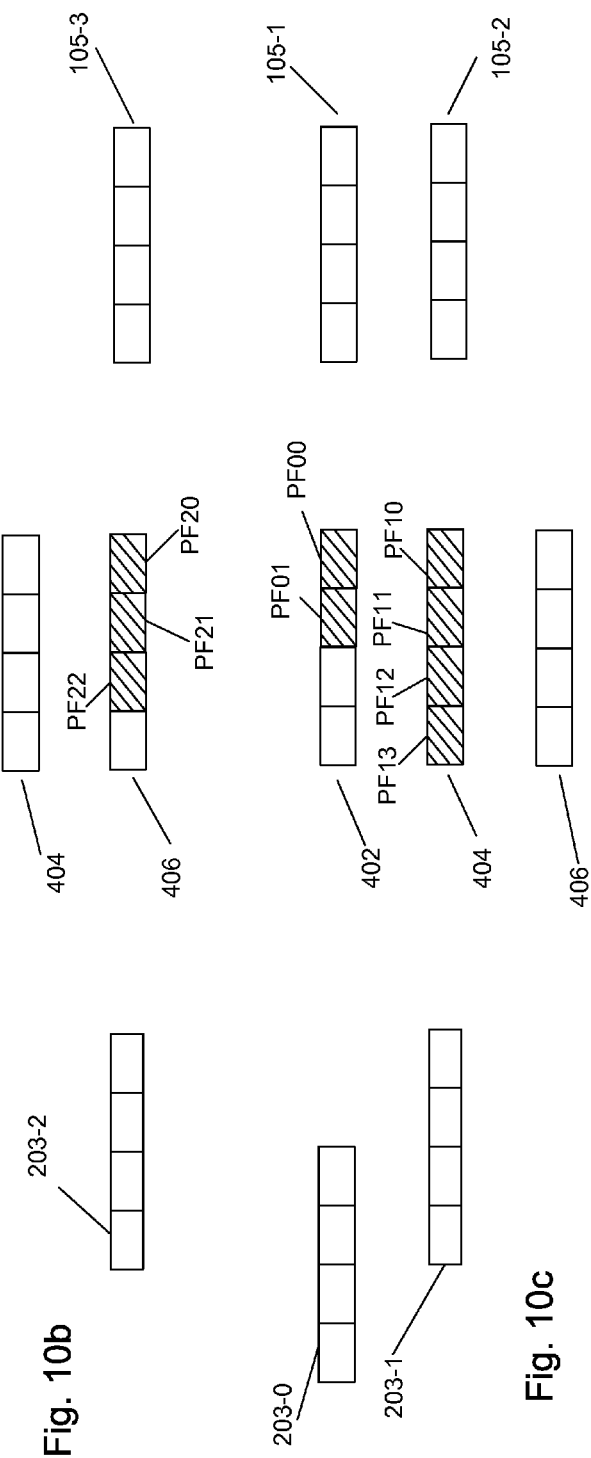
Fig. 10a
Fig. 10b
Fig. 10c

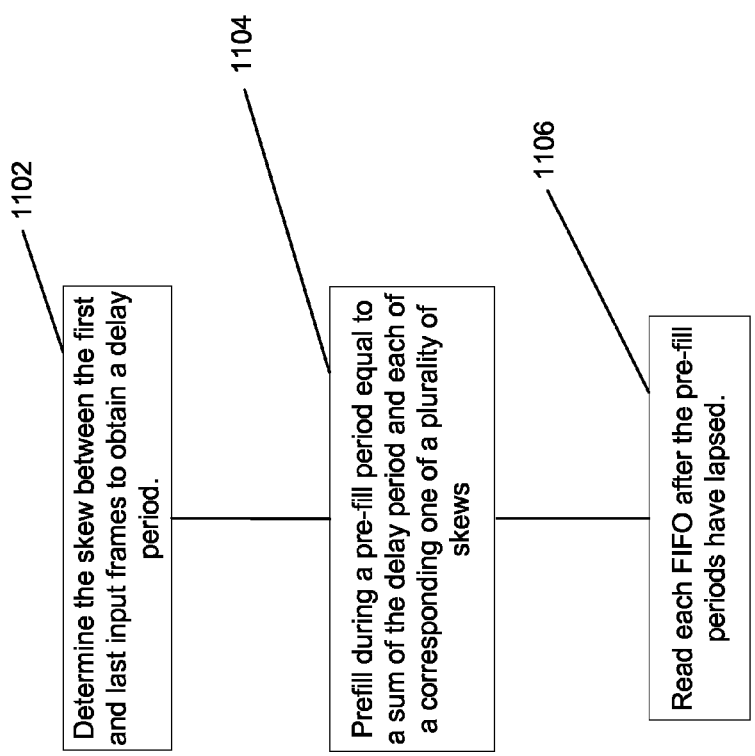

TEMPORAL ALIGNMENT OF DATA UNIT GROUPS IN A SWITCH

BACKGROUND

Switches are known that receive data on one or more input ports and supply the data at one or more output ports. Such switches may include an input stage, which receives the data; an intermediate stage, which includes a switch fabric; and an output stage that supply the data to the output ports. Typically, the data is grouped in data units and the switch fabric simultaneously switches a plurality of such data units at a given time. Each data unit may be associated with a particular time slot.

However, the data units may arrive at different input ports at different times, such that various data units may be delayed or skewed relative to one another. In addition, the lengths of paths extending from various input ports to corresponding output ports of the switch may also differ. As a result, data units propagating through the switch may be skewed relative to one another for this reason also. Accordingly, data units may be supplied to the switch fabric at different times, such that simultaneous switching of such data unit groups by the switch fabric may be difficult to achieve.

In one technique that may be used to insure simultaneous switching by the switch fabric, each data unit may be provided to a corresponding first-in-first-out (FIFO) buffer prior to being supplied to the switch fabric. Each FIFO is then "filled" whereby symbols or data units are sequentially fed to the FIFO and stored in corresponding stages or portions thereof. Since the data units may be supplied to the FIFO at different times, certain FIFOs may begin to "fill" or be "prefilled" with data before others. When one of the FIFOs receives the "slowest" data unit, i.e., that data unit group with the greatest delay or skew relative to the other data units, each of the remaining FIFOs sequentially outputs the pre-filled data stored therein. Thus, each FIFO simultaneously outputs the data of each data unit, and each data unit group is therefore temporally aligned prior to being input to the switch fabric. The switch fabric can then simultaneously switch the incoming data unit groups.

In certain instances one or more of the data units supplied to the FIFO buffers may be unavailable or "missing", for example, because the corresponding input port is disconnected or a data unit group circuit provided in the switch cannot identify a boundary or edge of an input data unit group supplying data units to the switch. In that case, the FIFOs that receive data, will, as noted above, output data to the switch fabric once the slowest data unit is received by a corresponding FIFO.

If the slowest data unit is the missing data unit group, however, the remaining FIFOs may not pre-fill a sufficient amount of data before being supplied to the switch fabric. Accordingly, when the slowest data unit group is supplied to its corresponding FIFO, i.e., the slowest data unit becomes "available", the other data units may be output to the switch fabric before the slowest data unit is supplied to its corresponding FIFO. The slowest data unit, therefore, will lag the remaining data units, such that not all data units input to the switch fabric will be temporally aligned, and the switch fabric may not be able to simultaneously switch each of the incoming data units.

An apparatus and related method is therefore needed wherein data units are temporally aligned prior to input to the switch fabric, regardless of whether the slowest data unit is available.

SUMMARY

Consistent with the present disclosure, an apparatus is provided that comprises a plurality of memories and an input circuit. The input circuit is configured to supply a plurality of input data units. A signal generator is also provided that is configured to output a signal. Each of the plurality of memories is configured to store data from a corresponding one of the plurality of input data units for a duration based on a respective one of a plurality of skews. Each of the plurality of skews is relative to a reference time, which follows a time associated with a portion of the signal by a delay. The delay corresponds to a length of time during which a respective one of the plurality of input data units travels from the input circuit to a respective one of the plurality of memories. The plurality of memories is configured to supply a plurality of output data units at the reference time, such that each of the plurality of output data units is temporally aligned with one another.

Consistent with an additional aspect of the present disclosure, an apparatus is provided that comprises a plurality of memories and an input circuit configured to supply a plurality of input data units. A signal generator is also provided that is configured to output a signal. Each of the plurality of memories is configured to store data from a corresponding one of the plurality of input data units for a duration based on a respective one of a plurality of skews. Each of the plurality of skews is relative to a reference time, which follows a time associated with a portion of the signal by a delay. The corresponds to a length of time during which one of the plurality of input data units travels from the input circuit to a respective one of the plurality of memories. In addition, a switch fabric is provided. The plurality of memories is configured to supply a plurality of output data units at the reference time to the switch fabric, such that each of the plurality of output data units is temporally aligned with one another.

Consistent with a further aspect of the present disclosure, an apparatus is provided that comprises a plurality of memories. A first one of the plurality of memories is configured to receive a first one of a plurality of input data units at a first time, and a second one of the plurality of memories is configured to receive a second one of the plurality of input data units at a second time. The second time is delayed relative to the first time by a delay period, and each of remaining ones of the plurality of memories is configured to receive a corresponding one of remaining ones of the plurality of input data units. A witch fabric is also provided. Data from each of the plurality of input data units is stored in a respective one of the plurality of memories during a corresponding one of a plurality of pre-fill periods. Each of the plurality of pre-fill periods is based on a sum of the delay period and a corresponding one of a plurality of skews. Each of the plurality of skews corresponds to a delay between a corresponding one of times at which each of the plurality of input data units is supplied to a corresponding one of the plurality of memories and the second time. A plurality of output data units is supplied from the plurality of memories to the switch fabric after each of the plurality of pre-fill periods have lapsed.

It is to be understood that both the foregoing general description and the following detailed description are exemplary and explanatory only and are not restrictive of the invention, as claimed.

The accompanying drawings, which are incorporated in and constitute a part of this specification, together with the description, serve to explain the principles of the disclosure.

BRIEF DESCRIPTION OF THE DRAWINGS

FIGS. 6a, 6b, and 6c illustrate timing diagrams consistent with an aspect of the present disclosure;

FIGS. 10a, 10b, and 10c illustrate timing diagrams consistent with additional aspects of the present disclosure; and FIG. 11 illustrates a flow chart consistent with a further aspect of the present disclosure.

DESCRIPTION OF THE EMBODIMENTS

Consistent with the present disclosure, a plurality of FIFO buffers, for example, are provided in a switch, which also includes a switch fabric. Each of the plurality of FIFOs is pre-filled with data for a duration based on a skew or time difference between the time that a data unit is supplied to its corresponding FIFO and a reference time. The reference time is the time, for example, after a delay period has lapsed following the leading edge of a synch signal, the timing of which is a known system parameter and is used to trigger switching in the switch fabric. Typically, the delay period may be equal to the latency (often, another known system parameter) or length of time required for the data unit to propagate from an input circuit, such as a line card of the switch or another switch, to the FIFO that receives the data unit. At the reference time, temporally aligned data units (each of which including a series bits and corresponding to a particular time slot) may be read or output from each FIFO and supplied to the switch fabric. Since the timing of the output from the FIFOs is based on known system parameters, instead of the actual arrival of the slowest data units at its corresponding FIFO, time aligned data units may be output regardless of whether the slowest data unit is available.

Reference will now be made in detail to embodiments of the present disclosure, examples of which are illustrated in the accompanying drawings. Wherever possible, the same reference numbers will be used throughout the drawings to refer to the same or like parts.

Figure 1:
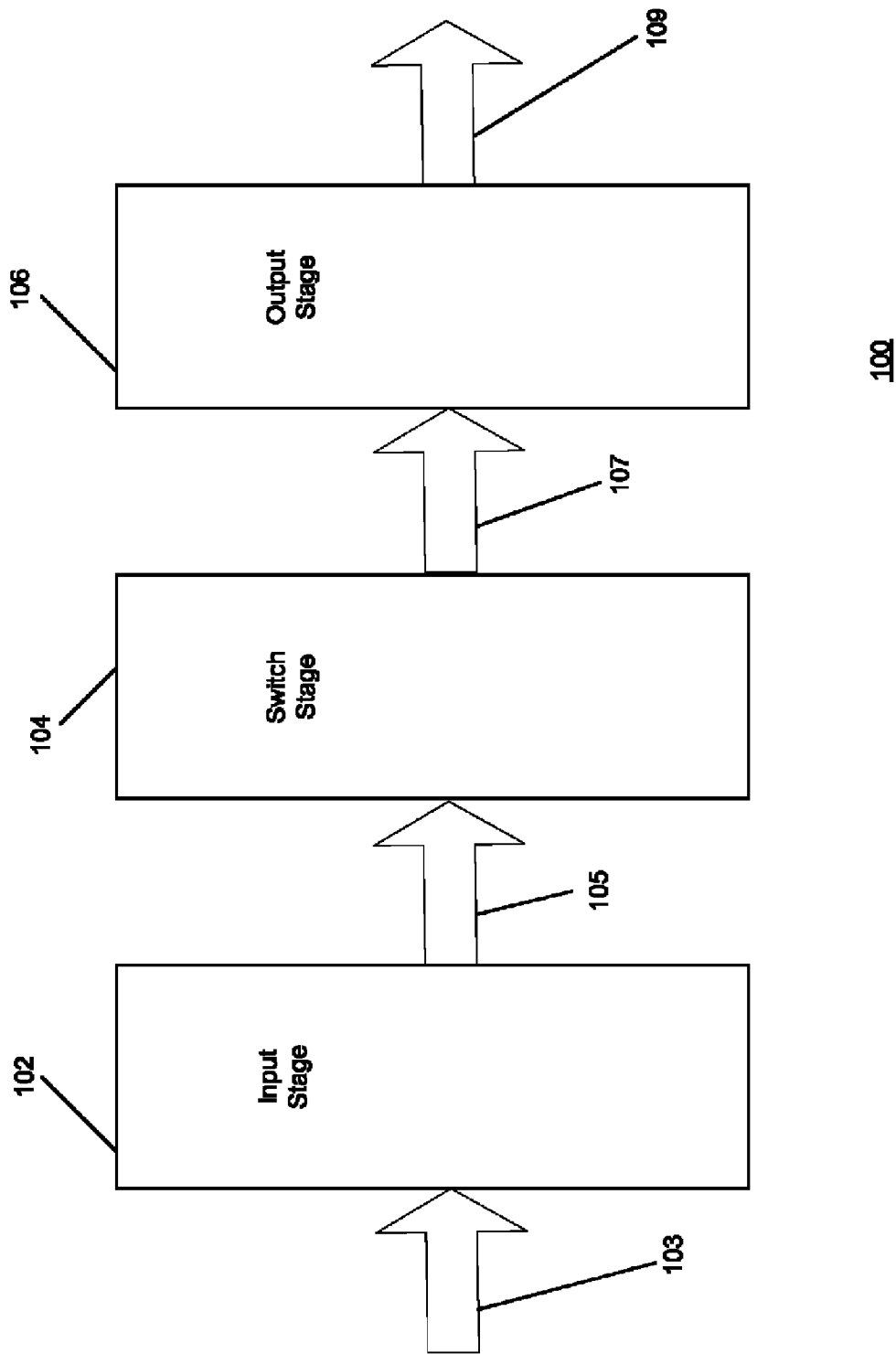
FIG. 1 illustrates a block diagram of a switch consistent with the present disclosure.

FIG. 1 illustrates a switch 100 consistent with an aspect of the present disclosure. Switch 100 may be provided in an optical network and may receive wavelength division multiplexed optical signals, which may be optically demultiplexed and converted into corresponding electrical signals by known demultiplexer and receiver circuitry. and Switch 100 includes an ingress or input stage 102 that receives input data (represented by arrow 103), decapsulates the input data with known circuitry, and outputs the decapsulated data as output data unit groups (represented by arrow 105). The output data unit groups are switched by a switch fabric (not shown in FIG. 1) in switch stage 104, and supplied as switched data unit groups (represented by arrow 107). The switched data unit groups are next supplied to output stage 106, which de-encapsulates the switched data unit groups and supplies the data included therein as output data 109.

Figure 2:
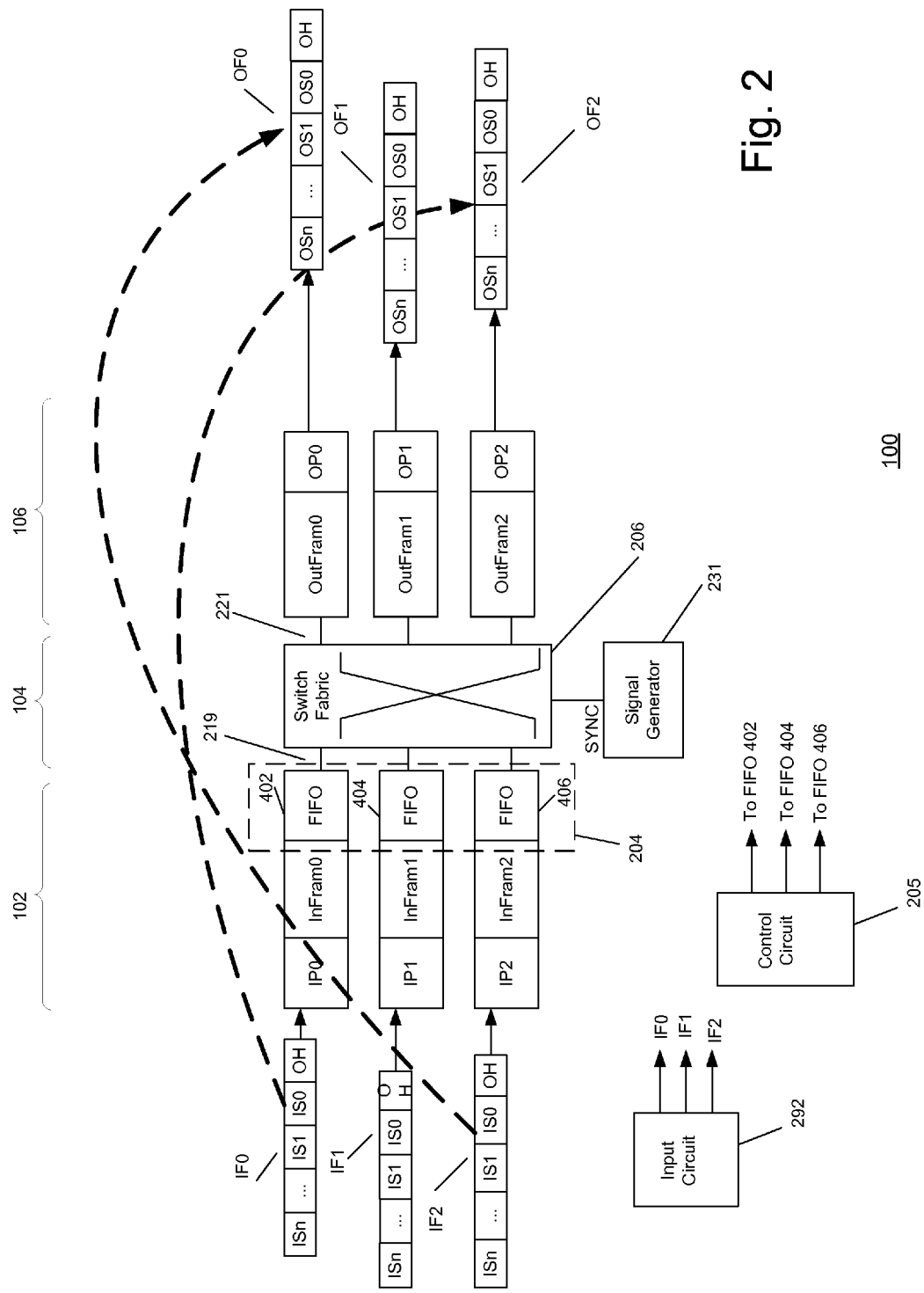
FIG. 2 illustrates a detailed block diagram of the switch shown in FIG. 3.

FIG. 2 shows a more detailed block diagram of stages 102, 104, and 106 of switch 100. Input stage 102 includes a plurality of input ports IP0 to IP2, each of which receiving a corresponding one of input frames IF0 to IF2 from an input circuit 292, which may include a line card of switch 100 or another switch. Input frames IF0 to IF2 includes a group of input data units IS0 to ISn (collectively referred to as an "input data unit group") and an overhead portion, OH. Each data unit IS0 to ISn includes bits or one or more symbols and is associated with a corresponding one of a plurality of time slots.

Each of input ports IP0 to IP2 forwards a corresponding one of input frames IF0 to IF2 to a respective one of input circuits or input framer circuits InFram0 to InFram2, which de-capsulate the data units IS0 to ISn in each of input frames IF0 to IF2 by removing the overhead portion OH in each frame. The de-capsulated data units IS0 to ISn (input data units or input data unit group) of each input frame IF0 to IF2 are then passed to skew logic 204, which includes memories or memory circuits, such as first-in-first-out (FIFO) buffer circuits 402, 404, and 406 or other suitable memories, such as random access memories. The data units output from skew logic 204 are timed so that each data unit (or output data unit) output from one of FIFOs 402, 404, and 406 is temporally aligned with an output data unit output from remaining ones of 402, 404, and 406 (see discussion below). Such temporally aligned output data units are then provided to switch fabric circuit 206 via inputs 219 in response to control signal supplied by control circuit 205 (discussed below). The input data units (IS1 to ISn) are then switched by switch fabric 206 in response to switch fabric synch signal SYNC output from signal generator 231, and each is output as an output data unit (OS) and is directed to a corresponding one of framer circuits OutFram0 to OutFram2 via a respective one of switch fabric outputs 221. Framer circuits OutFram0 to OutFram2, in turn, encapsulate the output data units into data unit groups and attach overhead portions (OH) to corresponding groups of data units. As a result, output frames OF0 to OF2, including corresponding groups of output data units OS0 to OSn, are provided to respective output ports OP0 to OP1 and then output from switch 100.

In the example shown in FIG. 2, switch 100 may switch, for example, data unit IS1 of input frame IF2 may be switched and output from switch 100 as data unit OS0 of output frame OF0, and data unit IS0 of input frame IF0 may be switched and output from switch 100 as data unit OS1 of output frame OF2.

Figure 3:
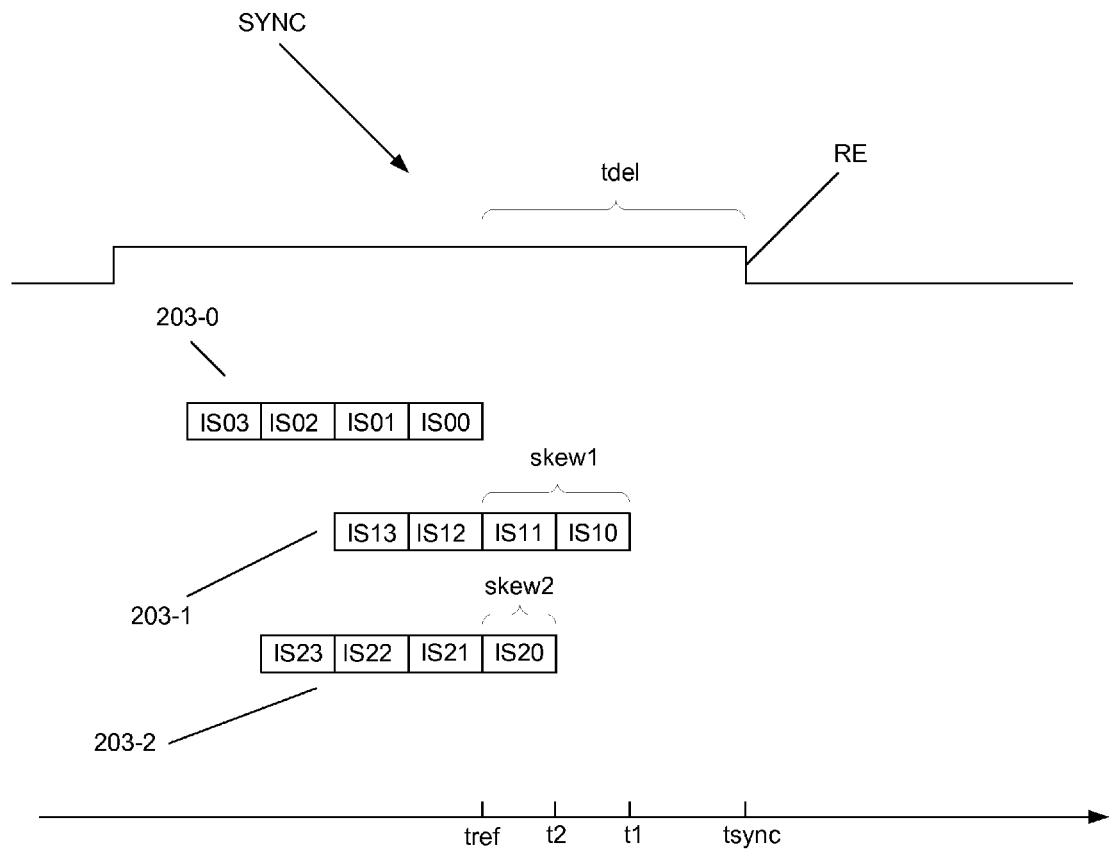
FIG. 3 illustrates a timing diagram consistent with an aspect of the present disclosure.

Examples of input data unit groups having different delays or latency are shown in timing diagram 300, which is illustrated in FIG. 3. It is understood that in the following examples, as well as the above example, the present disclosure is not limited to the number of input and output frames, buffers, framing circuits, and input and output ports, as that discussed above. Rather, any appropriate number of such circuits, frames, and ports is contemplated herein. In addition, in FIGS. 3, 4a-4c, 5a-5c, 6a-6c, and 7a-7c, the reference characters identifying input and output data units have been renumbered, for clarity.

In particular, input data unit groups 203-0, 203-1, and 203-2 (which may be de-capsulated from input frames IF0 to IF2, respectively, as noted above) are each output from a respective one of InFram0 to InFram2. Input data unit group 203-0 includes of input symbols or data units IS00 to IS03, input data unit group 203-1 includes input symbols or data units IS10 to IS13, and input data unit group 203-2 includes input symbols or data units IS20 to IS23. As noted above, each data unit and data unit group may experience a different delay or skew, and may thus be input to skew logic 204 at different times. Namely, in the example shown in FIG. 3, input data unit group 203-1 may be input to skew logic circuit 204 at time t1, followed by input data unit groups 203-2 and 203-0 at times t2 and tref, respectively. As shown in FIG. 3, input data unit group 203-0 is the "slowest" of the three data unit groups in that it arrives at skew logic 204 after the other two input data unit groups have been supplied thereto. Input data unit group 203-1 has skew skew1 relative to input data unit group 203-0, and input data unit group 203-2 has skew skew2 relative to input data unit group 203-0.

Tref, the time at which input data unit group 203-0 reaches the skew logic 204, occurs after delay or latency (tdel) following rising edge RE of switch fabric synch signal SYNC output from signal generator 231 shown in FIG. 2. Such latency, tdel, may be the length of time during which the slowest input data unit group 203-0 travels from input circuit 292 to skew logic 204. A delay equal to such latency following rising edge RE is indicative of the time at which input data unit group 203-0 arrives at skew logic 204. As noted above, the latency is a parameter associated with switch 100, and can be used with rising edge RE, to determine the timing at which skew logic 204 outputs data units in a temporally aligned fashion to switch fabric 206.

Figure 8:
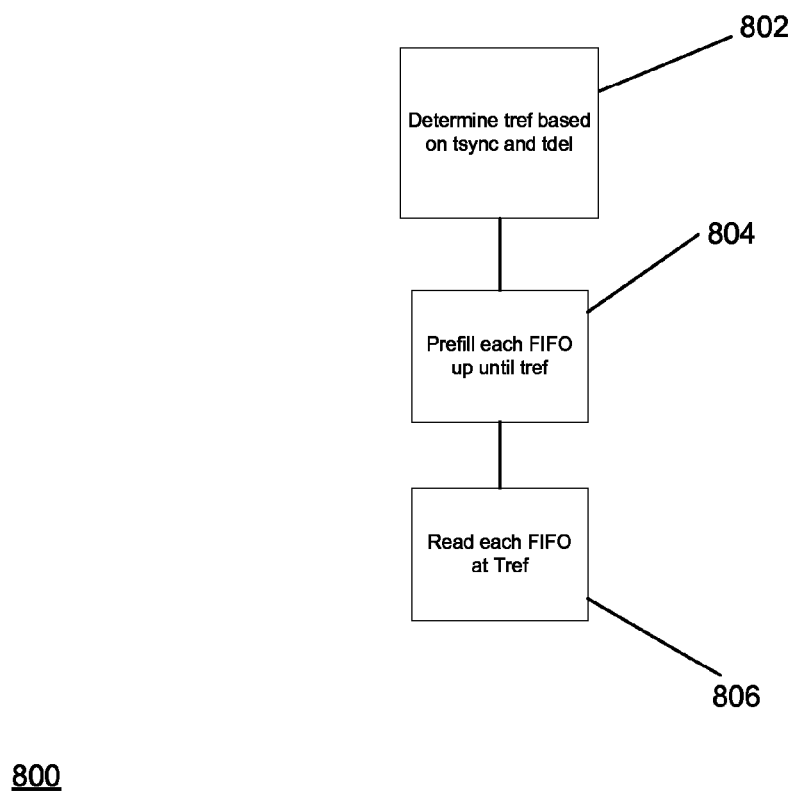
FIG. 8 illustrates a flow chart consistent with an additional aspect of the present disclosure.

In particular, with reference to FIG. 8, a skew adjusting method consistent with the present disclosure will next be described with reference to flow chart 800 shown in FIG. 8. In a first step (802), control circuit 205, for example, may determine reference time (tref) based on time tsync and latency tdel. For example, tref may be calculated as the time after which a time period equal or substantially equal to latency tdel has lapsed following the time, tsync, associated with the rising edge of signal SYNC. Tsync may also be considered as time, t=0, and, as discussed below, other timings may be obtained with reference to tsync.

Tref may be expressed as the sum of tsync plus latency tdel. Tref, therefore, is the effective time at which the slowest data unit group, 203-0 in the example shown in FIG. 3, arrives at skew logic 204.

Figure 4A:
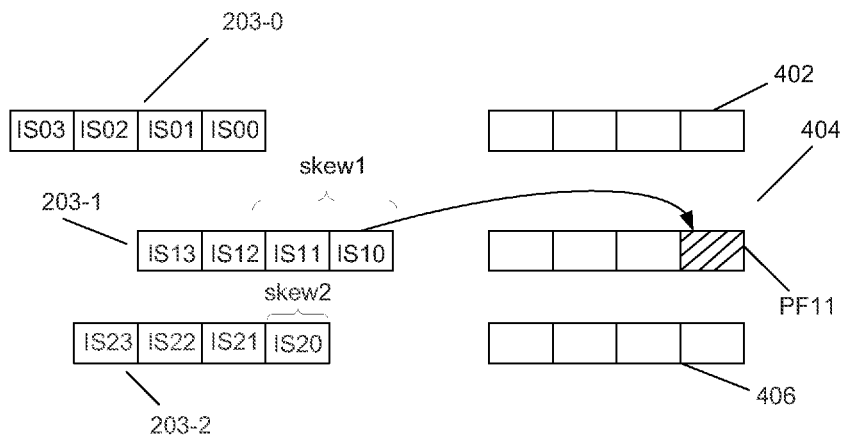
FIGS. 4a, 4b, and 4c illustrate timing diagrams consistent with an aspect of the present disclosure.

Returning to FIG. 8, in step 804, based on control signals output from control circuit 205, FIFOs in skew logic 204 (see FIFOs 402, 404, and 406, for example, discussed below in connection with FIGS. 4a-4c) are pre-filled until tref. Next, in response to further control signals from control circuit 205, the FIFOs simultaneously output the data stored therein, such that the data, and, therefore, the data unit groups output from the FIFOs, i.e., output data units in each group supplied from skew logic 204, are temporally aligned. Although the timing (tref) associated with the output from skew logic 204 may be the same as that associated with the actual arrival of the slowest input data unit group 203-0 to skew logic 204, the output from skew logic 204 is based on a calculation of the tref based on the timing of the switch fabric synch signal SYNC and latency tdel. Otherwise, as further noted above, if the output timing were based on the actual arrival of the slowest input data group 203-0, the output data groups from skew logic 204 may be mis-aligned if input data group 203-0 were missing.

Examples of the operation of skew logic 204 will next be described with reference to FIGS. 4a-4c, 5a-5c, 6a-6c, and 7a-7c. In FIG. 4a, each of input data unit groups 203-0, 203-1, and 203-2 is available and is supplied to a corresponding one of memories, such as FIFO buffers 402, 404, and 406, respectively, of skew logic 204. FIG. 4a also shows the relative timing of input data unit groups 203-0, 203-1, and 203-2 with respect to one another at time t1 in FIG. 3. As noted above, at time t1, the "fastest" input data unit group in this example, input data unit group 203-1, arrives at a corresponding FIFO buffer 404 before input data unit groups 203-0 and 203-2 arrive at respective FIFO buffers 402 and 406. As further shown in FIG. 4a, FIFO 404 is pre-filled with a first grouping of bits, or symbol, IS10, which is stored in stage PF11 of FIFO 404.

Figure 4B:
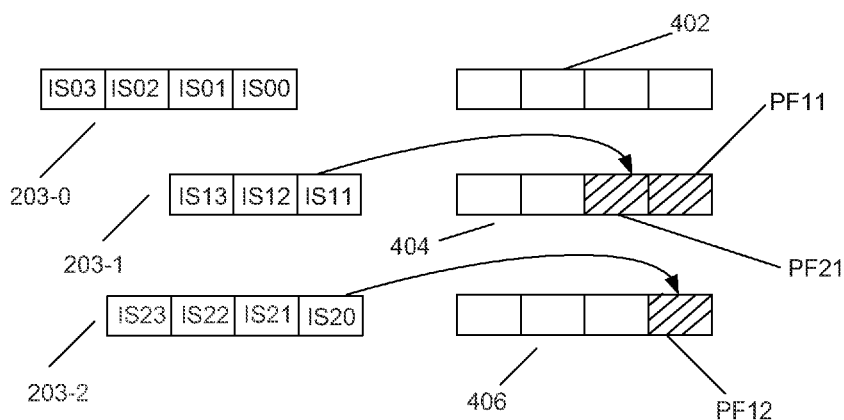
Figure 4C:
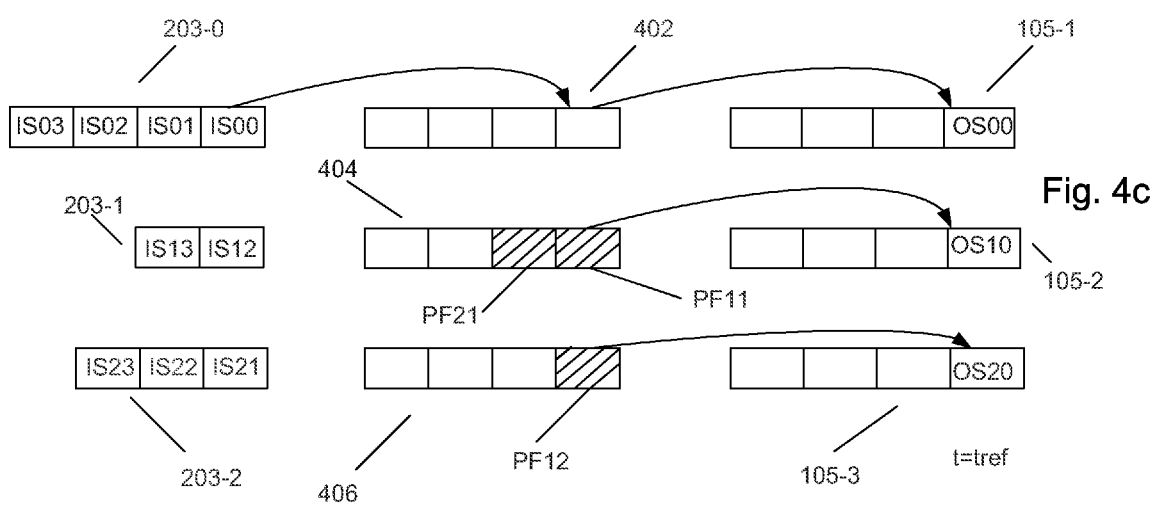

Next, as shown FIG. 4b, input data unit group 203-2 reaches corresponding FIFO buffer 406 at time t2, and thus buffer 406 is pre-filled with bits or input data unit IS20, which is stored in stage PF21 of FIFO 406. Also, at time t2, additional bits or input data unit IS11 is stored or pre-filled in stage PF12 of FIFO buffer 404. Then, at time tref, following delay or latency tdel after edge RE of signal SYNC, input data unit IS00 of the slowest data unit group 203-0 are supplied to FIFO 402, and then output therefrom as data unit OS00 of output data unit group 105-1 (see FIG. 4c). In a similar fashion, bits or data units IS10 and IS20 are output from FIFO buffers 404 and 406, respectively, as bits or output data units OS10 and OS20 of data unit groups 105-2 and 105-3. Remaining bits of each input data unit group are successively input and then output from FIFO buffers 402, 404, and 406 as output data unit groups 105-1 to 105-3. Since the output data unit groups are read or supplied from FIFO buffers 402, 404, and 406 at substantially the same time, each output data unit group is temporally or time aligned with one another and may therefore be properly switched by switch fabric 206.

Figure 5A:
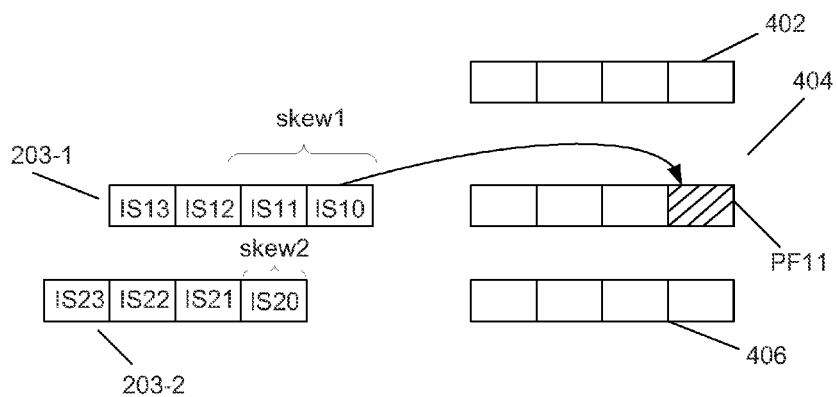
FIGS. 5a, 5b, and 5c illustrate timing diagrams consistent with an aspect of the present disclosure.
Figure 5B:
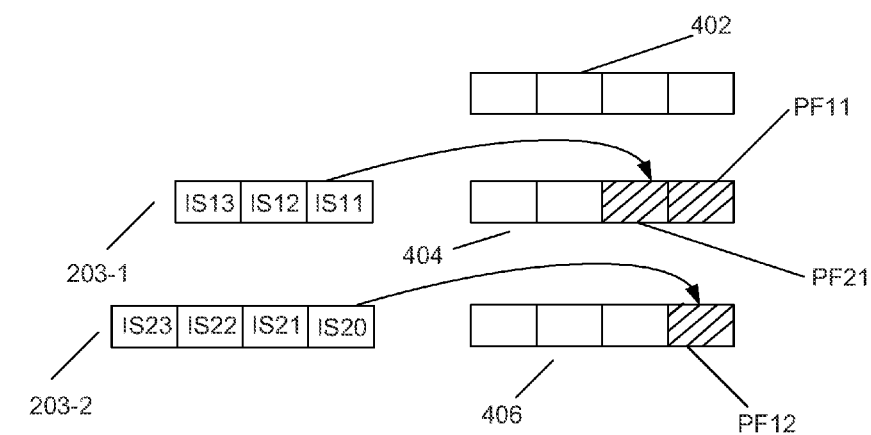
Figure 5C:
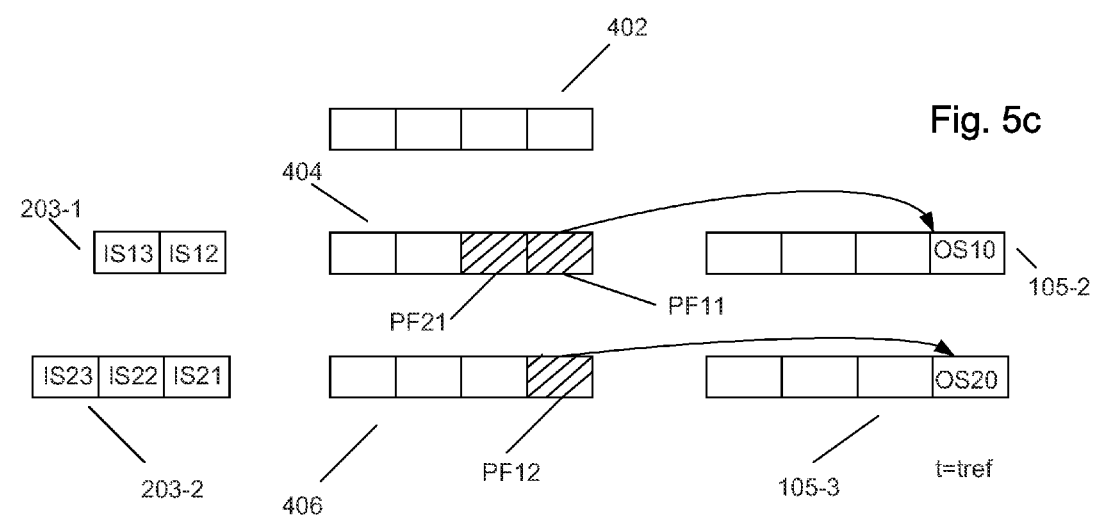

FIGS. 5a-5c show similar diagrams of the relative timing of input data unit groups 203-1 and 203-2 at times t1, t2, and tref, as those discussed above in connection with FIGS. 4a-4c. In FIGS. 5a-5c, however, input data unit group 203-0 is missing or unavailable. Nevertheless, the timing of the supplying or reading of output data unit groups 105-2 and 105-3 is typically the same as if the slowest data unit group 203-0 was present (see FIG. 4c). That is, output data unit groups 105-2 and 105-3 are temporally aligned.

Figure 7A:
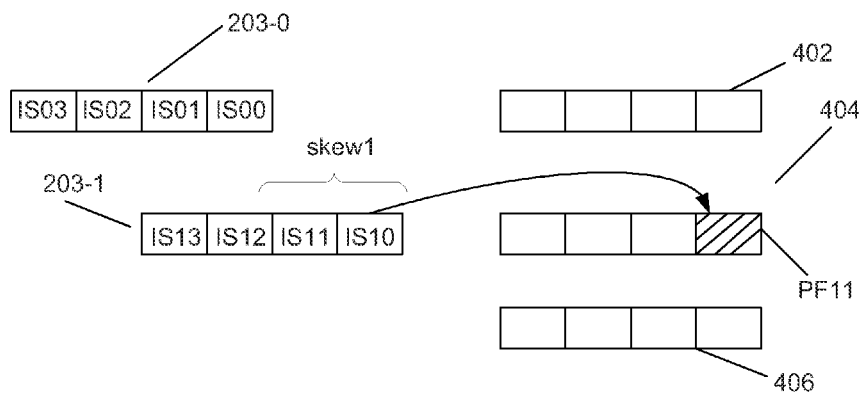
FIGS. 7a, 7b, and 7c illustrate timing diagrams consistent with an aspect of the present disclosure.
Figure 7B:
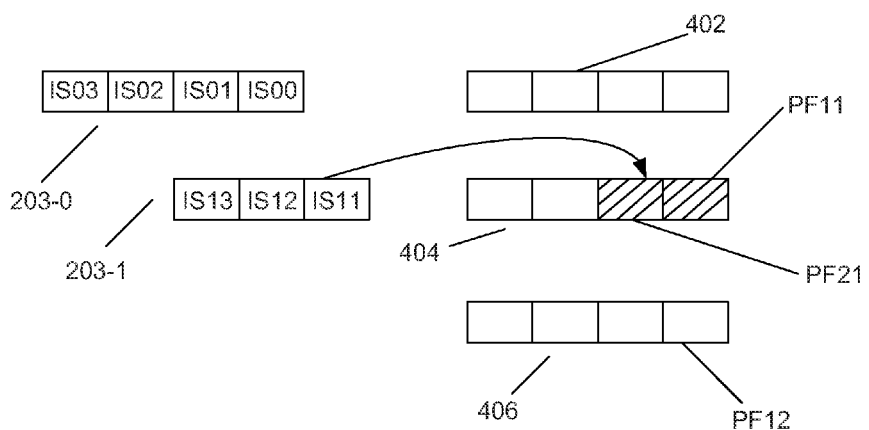
Figure 7C:
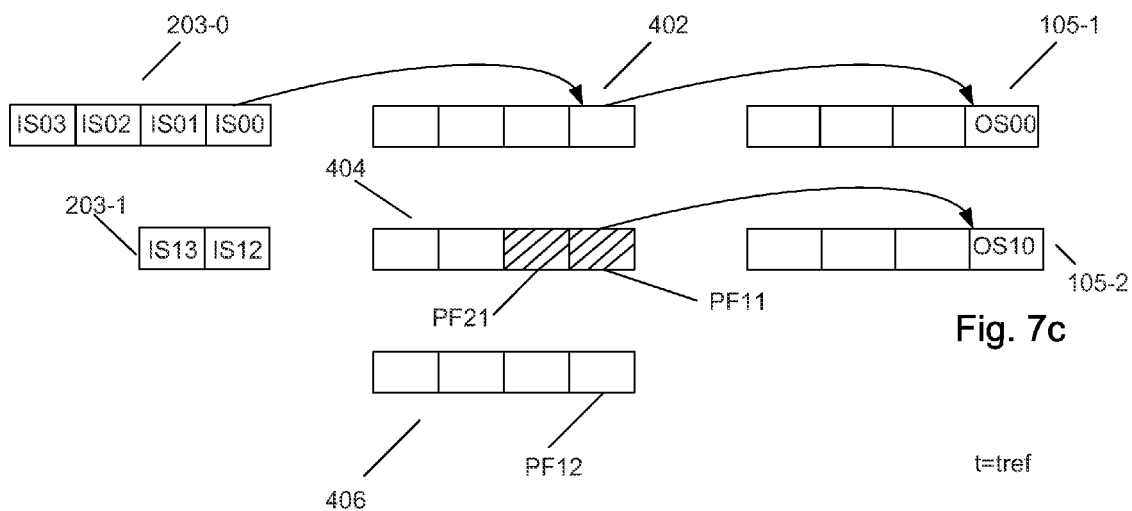

In FIGS. 6a-6c, relative timing of input data unit groups 203-0 and 203-2 are shown at times t1, t2, and tref, respectively (input data unit group 203-1 is missing), and, in FIGS. 7a-7c (input data unit group 203-2 is missing), relative timing of input data unit groups 203-0 and 203-1 are also shown at times t1, t2, and tref, respectively. In FIG. 6c, output data unit groups 105-1 and 105-2 are temporally aligned, and, in FIG. 7c, output data unit groups 105-1 and 105-3 are aligned. Thus, in each of the scenario shown in FIGS. 4a-4c, 5a-5c, 6a-6c, and 7a-7c, output data unit groups from the FIFO buffers of skew logic 204 are temporally aligned, regardless of which input data unit groups are present.

As noted above, the number of input and output data unit groups and the length, in bits, of each input and output data unit group are exemplary only. It is understood that any appropriate number of such data unit groups and bits is contemplated herein. In addition, it is understood, that any appropriate number of input ports, input circuits, memories (e.g., FIFOs), switch fabric input and outputs, framer circuits (e.g., OutFram) and output ports may be provided, and the present disclosure is not limited to the specific number of such circuits.

Thus, since the output of data is not dependent upon the arrival time of any particular input data unit group, storing or writing data of each input data unit group (e.g., input data unit groups 203-0, 203-1, and 203-2) into the FIFO buffers 402, 404, and 406 is preferably decoupled or independent of the reading or supplying of output data unit groups from the FIFO buffers. Conventionally, however, writing and reading operations to a memory are often dependent or related to one another based on the following formula:

$$WFP-RFP=WFIFOP-RFIFOP$$

where, WFP is the write data unit group pointer, an indicator of the first portion of the input data unit group to be written to the FIFO, and RFP is the read data unit group pointer, an indicator of the first portion of the stored data unit group to be output from the FIFO. In addition, WFIFOP is the write FIFO pointer, an indicator of the first FIFO position which is written to, and RFIFOP is the read FIFO pointer, an indicator of the first FIFO position from which data is read. When a data unit group becomes available, the above formula can be used to determine the write FIFO pointer.

If the input data unit group, e.g., 203-0, has a different length, in bits, than a length of the corresponding FIFO buffer, e.g. buffer 402, when the input data unit group becomes available, it may not be written to the first position of the FIFO. Accordingly, the length of the data unit group is preferably an integer multiple of the length of the FIFO to insure that the first bits of a data unit group that is made available, after being missing, is written to the first location of the FIFO. Otherwise, since bits are output successively from each FIFO, the data unit groups having first bits stored in FIFO positions other than the first FIFO position, will be delayed relative to those data unit groups having first bits stored in first FIFO positions.

Figure 9:
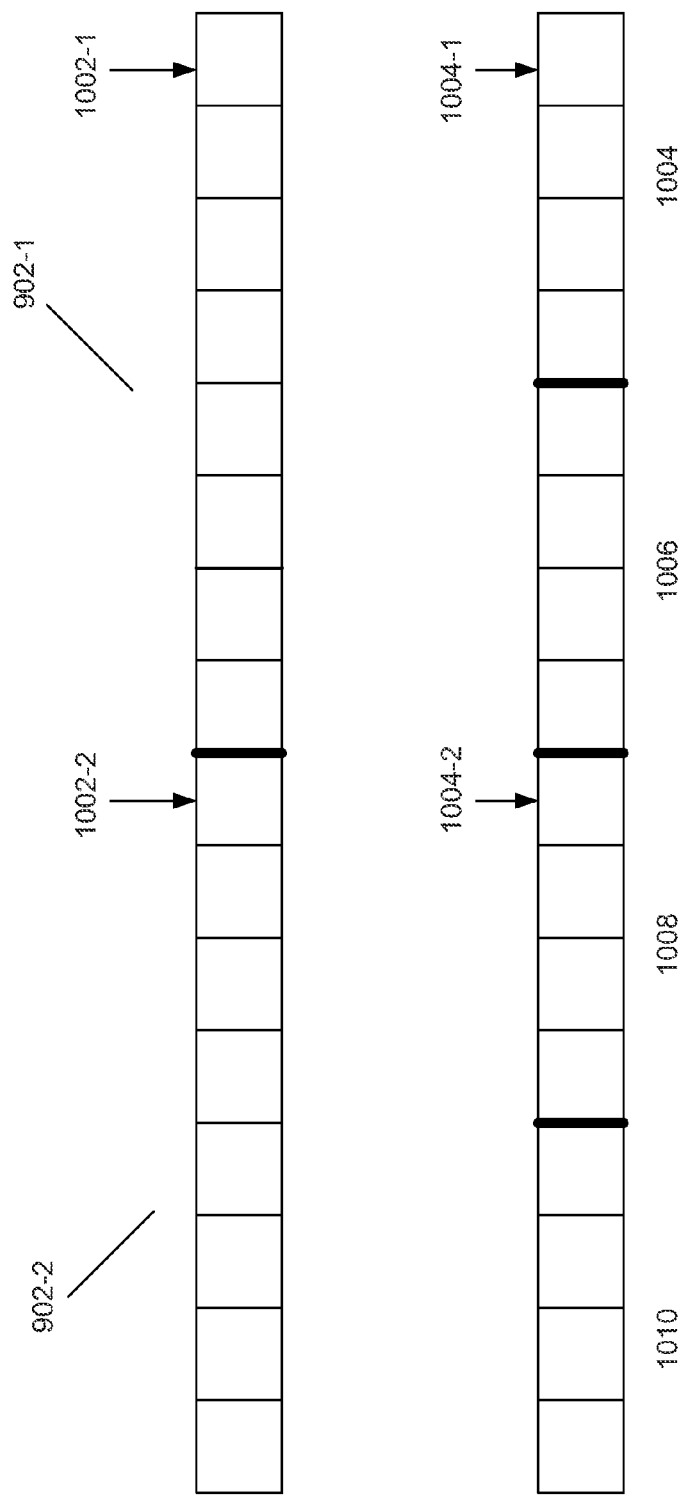
FIG. 9 illustrates a data unit group and associated FIFO buffers consistent with a further aspect of the present disclosure.

Thus, by way of example, FIG. 9 shows input data unit groups 902-1 and 902-2 having read/write data unit group pointer 1002-1 and 1002-2, respectively. Each of input data unit groups 902-1 and 902-2 has a length, in this example, of eight bits or symbols. FIG. 9 further shows FIFO buffers 1004, 1006, 1008, and 1010, each of which, in this example, having a length of 4 bits or symbols. Thus, the length of data unit groups 902-1 and 902-2 is an integer (two) multiple of the length of each of FIFO buffers 1004, 1006, 1008, and 1010. Accordingly, FIFO read/write pointers 1004-1 and 1004-2 will be in the first position of each FIFO. Such pointers will also coincide with the read/write data unit group pointers 1002-1 and 1002-2, thereby insuring that the first portion of each input data unit group (e.g., 203-0) will be written to the first FIFO position indicated by pointers 1004-1 or 1004-02, for example. As a result, reading from the FIFO will typically be from a first FIFO position (e.g., position 1002-2).

Another embodiment of the present disclosure will next be described with reference to FIGS. 10a, 10b, 10c and 11, which show various input data unit group scenarios similar to those discussed above in connection with FIGS. 5a-5c, 6a-6c, and 7a-7c. In each of these scenarios, FIFO buffers 402, 404, and 406 associated with available input data unit groups are pre-filled for a duration at least equal to the delay or skew between the first input data unit group to be received by a FIFO and the last or slowest input data unit group to be received by a FIFO.

FIG. 11 shows a flow chart 1100 in connection with method illustrative of the present embodiment. In a first step 1102, control circuit 205 may determine, for example, the time t1 at which the first input data unit group 203-1 reaches input buffer 404 and time tref at which the last (or slowest) input data unit group 203-0 is supplied to FIFO buffer 402. Such skew or delay may be referred to herein as a delay period (DP). In a second step 1104, the FIFO buffers (e.g., FIFO buffers 402, 404, and 406) are pre-filled during a pre-fill period equal to a sum of the delay period and each of a corresponding one of a plurality of skews. Then, in step 1106, each FIFO is read after the pre-fill periods have lapsed.

In the example shown in FIG. 10a, input data unit group 203-0 is missing, but input data unit groups 203-1 and 203-2 pre-fill corresponding FIFO buffers 404 and 406 for a duration of pre-fill period, such that positions or stages PF10 and PF11 in FIFO buffer 404 and positions PF21 and PF22 of FIFO 406 are pre-filled during delay period DP. Since input data unit group 203-1 arrives at buffer 404 before input data unit group 203-2, input data unit group 203-1 pre-fills FIFO buffer 404 to a greater "depth" to further store data in position PF12. That is, buffer 404 is filled for a pre-fill period equal to the sum of the delay period plus the skew (SK) of input data unit group 203-1 relative to time tref. After the pre-fill period associated with each input data unit group 203-1 and 203-2, the data stored in FIFO buffers 402 and 404 is read or supplied as output data unit groups 105-2 and 105-3 in a manner similar to that described with reference to FIG. 4c, for example.

In FIGS. 10b and 10c, input data unit groups 203-1 and 203-2 are respectively missing. Nevertheless, in both figures FIFO buffer 402 is pre-filled during delay period DP, prior to supplying the data stored therein in corresponding output data unit groups 105-1. Accordingly, in the example shown in FIGS. 10b and 10c, positions PF00 and PF01 are filled during the delay period DP. In FIG. 10b, positions PF20, PF21, and PF22 in FIFO 406 are filled during the extended pre-fill period, due to skew SK associated with the different arrival times of input data unit groups 203-0 and 203-2. Further, in FIG. 10c, positions PF10, PF11, PF12, and PF13 in FIFO 404 are filled during the extended pre-fill period, due to skew SK associated with the different arrival times of input data unit groups 203-0 and 203-1.

In each of the examples shown in FIGS. 10a, 10b, and 10c, any two of output data unit groups 105-1, 105-2, and 105-3, as the case may be, are temporally aligned with one another. It is noted, however, that if the missing data unit group is not the slowest data unit group (e.g., input data unit group 203-0), such as in the examples shown in FIGS. 10b and 10c, FIFO 402 unnecessarily pre-fills for the duration of delay period DP. Thus, the read operation of FIFO 402 in these instances is delayed while FIFO 402 pre-fills. Accordingly, the overall latency associated with the data carried by input data unit group 203-0 is increased, as such data passes through stages 102, 104, and 106 of switch 100. The embodiment discussed above in connection with FIGS. 3, 4a-4c, 5a-5c, 6a-6c, and 7a-7c, however, does not suffer from such increased latency.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus, comprising:
   a plurality of memories;
   an input circuit configured to supply a plurality of input data units; and
   a signal generator configured to output a signal, each of the plurality of memories is configured to store data from a corresponding one of the plurality of input data units for a duration based on a respective one of a plurality of skews, each of the plurality of skews being relative to a reference time, the reference time following a time associated with a portion of the signal by a delay, the delay corresponding to a length of time during which a respective one of the plurality of input data units travels from the input circuit to a respective one of the plurality of memories, wherein the plurality of memories are configured to supply a plurality of output data units at the reference time, such that each of the plurality of output data units is temporally aligned with one another.

2. An apparatus in accordance with claim 1, wherein each of the plurality of memories includes a buffer.

3. An apparatus in accordance with claim 1, wherein each of the plurality of memories includes a corresponding one of a plurality of first-in-first-out (FIFO) buffers.

4. An apparatus in accordance with claim 3, wherein each of the plurality of input data units includes a plurality of bits, and each of the plurality of FIFO buffers is configured to store a subset of the plurality of bits, a number of the plurality of bits being an integer multiple of a number of the subset of the plurality of bits.

5. An apparatus in accordance with claim 1, wherein each of the plurality of input data units includes a corresponding one of a plurality of groups of bits, and each of the plurality of output data units includes a respective one of the plurality of groups of bits.

6. An apparatus in accordance with claim 1, wherein each of the plurality of input data units is associated with a corresponding one of a plurality of time slots.

7. An apparatus, comprising:
a plurality of memories;
an input circuit configured to supply a plurality of input data units; and
a signal generator configured to output a signal, each of the plurality of memories is configured to store data from a corresponding one of the plurality of input data units for a duration based on a respective one of a plurality of skews, each of the plurality of skews being relative to a reference time, the reference time following a time associated with a portion of the signal by a delay, the delay corresponding to a length of time during which one of the plurality of input data units travels from the input circuit to a respective one of the plurality of memories; and
a switch fabric,
wherein the plurality of memories are configured to supply a plurality of output data units at the reference time to the switch fabric, such that each of the plurality of output data units is temporally aligned with one another.

8. An apparatus in accordance with claim 7, wherein each of the plurality of memories includes a buffer.

9. An apparatus in accordance with claim 7, wherein each of the plurality of memories includes a corresponding one of a plurality of first-in-first-out (FIFO) buffers.

10. An apparatus in accordance with claim 7, wherein each of the plurality of input data units includes a corresponding one of a plurality of groups of bits, and each of the plurality of output data units includes a respective one of the plurality of groups of bits.

11. An apparatus in accordance with claim 7, wherein each of the plurality of input data units is associated with a corresponding one of a plurality of time slots.

12. A method, comprising:
storing data from each of a plurality of input data units in a corresponding one of a plurality of memories for a duration based on a respective one of a plurality of skews, each of which being relative to a reference time, the reference time following a time associated with a portion of a signal by a delay, the delay being a length of time during which one of the plurality of input data units travels from a input circuit to a respective one of the plurality of memories; and
supplying a plurality of output data units from the plurality of memories at the reference time, such that each of the plurality of output data units is temporally aligned with one another.

13. A method in accordance with claim 12, further including:
receiving each of the plurality of output data units at a corresponding one of a plurality of inputs of a switch fabric; and
supplying each of the plurality of output data units from a corresponding one of a plurality of outputs of the switch fabric.

14. A method, comprising:
supplying a first one of a plurality of input data units to a first one of a plurality of memories at a first time;
supplying a second one of the plurality of input data units to a second one of the plurality of memories at a second time, the second time being delayed relative to the first time by a delay period;
supplying each of remaining ones of the plurality of input data units to a corresponding one of remaining ones of the plurality of memories;
storing data from each of the plurality of input data units in a respective one of the plurality of memories during a corresponding one of a plurality of pre-fill periods, each of the plurality of pre-fill periods being based on a sum of the delay period and a corresponding one of a plurality of skews, each of the plurality of skews corresponding to a delay between a corresponding one of times at which each of the plurality of input data units is supplied to a corresponding one of the plurality of memories and the second time; and
supplying a plurality of output data units from the plurality of memories after each of the plurality of pre-fill periods have lapsed.

15. A method in accordance with claim 14, further including:
receiving each of the plurality of output data units at a corresponding one of a plurality of inputs of a switch fabric; and
supplying each of the plurality of output data units from a corresponding one of a plurality of outputs of the switch fabric.

16. An apparatus in accordance with claim 15, wherein each of the plurality of input data units is associated with a corresponding one of a plurality of time slots.

17. An apparatus, comprising:
a plurality of memories, a first one of the plurality of memories is configured to receive a first one of a plurality of input data units at a first time, a second one of the plurality of memories is configured to receive a second one of the plurality of input data units at a second time, the second time being delayed relative to the first time by a delay period, and each of remaining ones of the plurality of memories is configured to receive a corresponding one of remaining ones of the plurality of input data units; and
a switch fabric,
wherein data from each of the plurality of input data units is stored in a respective one of the plurality of memories during a corresponding one of a plurality of pre-fill periods, each of the plurality of pre-fill periods being based on a sum of the delay period and a corresponding one of a plurality of skews, each of the plurality of skews corresponding to a delay between a corresponding one of times at which each of the plurality of input data units is supplied to a corresponding one of the plurality of memories and the second time, a plurality of output data units are supplied from the plurality of memories to the switch fabric after each of the plurality of pre-fill periods have lapsed.

18. An apparatus in accordance with claim 17, further including a switch fabric, the switch fabric having a plurality of inputs and a plurality of outputs, such that each of the plurality of output data units is supplied to a corresponding one of the plurality of inputs of the switch fabric and each of the plurality of outputs from the switch fabric supplies a corresponding one of the plurality of output data units.

* * * * *